April 29, 1958  N. F. FLESCH  2,832,441
CLASP BRAKE
Filed March 6, 1956  3 Sheets-Sheet 1

INVENTOR.
Norman F. Flesch
BY Walter S. Schlegel, Jr.
Atty

Witness:
Richard W. Carpenter

April 29, 1958  N. F. FLESCH  2,832,441
CLASP BRAKE
Filed March 6, 1956  3 Sheets-Sheet 3

INVENTOR.
Norman F. Flesch
BY Walter F. Schlegel, Jr.
Atty.

Witness:
Richard W Carpenter

United States Patent Office 2,832,441
Patented Apr. 29, 1958

2,832,441

CLASP BRAKE

Norman F. Flesch, Park Forest, Ill., assignor to American Steel Foundries, Chicago, Ill., a corporation of New Jersey Application March 6, 1956, Serial No. 569,886

5 Claims. (Cl. 188—56)

This invention relates to brake arrangements and more particularly to a brake arrangement for a railway car truck.

The invention comprehends a simple economical light weight clasp brake arrangement adapted for use on a modern high speed railway car truck.

The present day trend in the construction of modern high speed railway cars is toward light weight cars having low centers of gravity. One obvious way to considerably lighten the over-all weight of a car is to replace the conventional heavy and cumbersome car trucks with lighter, smaller trucks having one piece cast steel frames. However, although these newer trucks are smaller than the conventional trucks and therefore afford far less space for brake linkage and other elements necessarily mounted on the truck, their high speeds nevertheless require powerful and durable brake linkage arrangements. Also, because of the space problem it is essential, in many types of truck arrangements, that none of the brake linkage be disposed between the wheels of the truck as this space is needed for other parts and fittings.

It is, therefore, a primary object of this invention to provide a simple and compact, but highly efficient brake linkage especially adapted for use in high speed railway car trucks.

Another object of the invention is the provision of a brake arrangement wherein none of the brake elements is disposed between the wheels of the truck.

A further object of the invention is to provide a clasp brake mechanism wherein the majority of the brake linkage is disposed outboardly of the truck frame.

A more specific object of the invention is the provision of a clasp brake linkage arrangement having a power cylinder and slack adjusting device mounted on the outboard side of the frame and connected to the friction means through a pair of dead actuating levers fulcrumed to the ends of the frame.

These and other objects of the invention will be apparent from an examination of the following description and drawings, wherein:

Figure 5 is a fragmentary end elevational view of the structure illustrated in Figure 1, as seen from the right.

Figure 1:
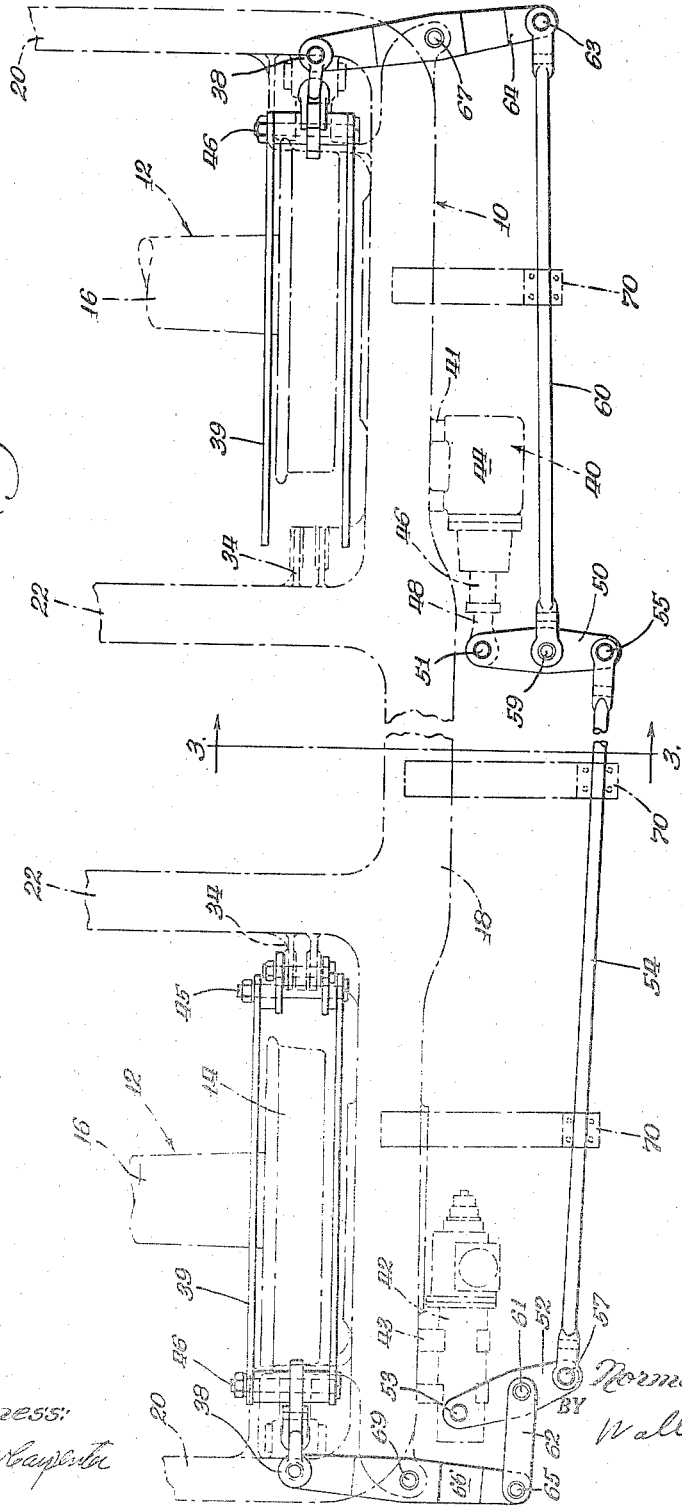
Figure 1 is a fragmentary top plan view of a railway car truck embodying features of my invention (only one side of the truck being shown as a similar arrangement may be provided on the opposite side)

It will be noted that certain elements have been intentionally omitted from certain views where they are better illustrated in other views.

Referring now to the drawing for a better understanding of the invention, it will be seen that the device is shown as applied to a railway car truck having a frame, indicated generally at 10. The frame may be supported in any desired manner (not shown) by a pair of spaced wheel and axle assemblies 12, each of which comprises a wheel 14 mounted on an axle 16.

As best seen in Figure 1, the frame 10 comprises a pair of side frames, or wheel pieces, 18 spaced from each other and interconnected at their ends by rails 20, and intermediate their ends by transoms 22, the end rails and transoms preferably being formed integrally with the side frames.

Figure 2:
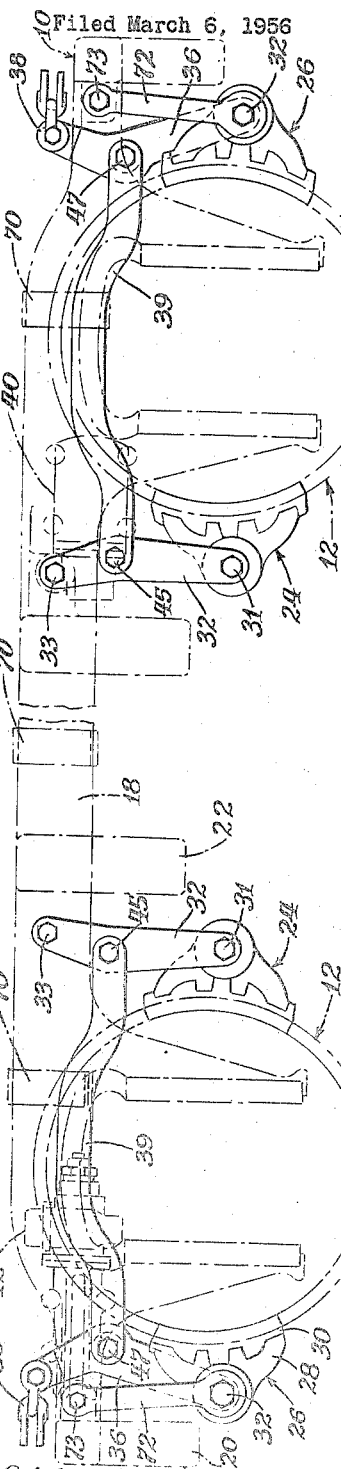
Figure 2 is a side elevational view of the structure illustrated in Figure 1.
Figure 3:
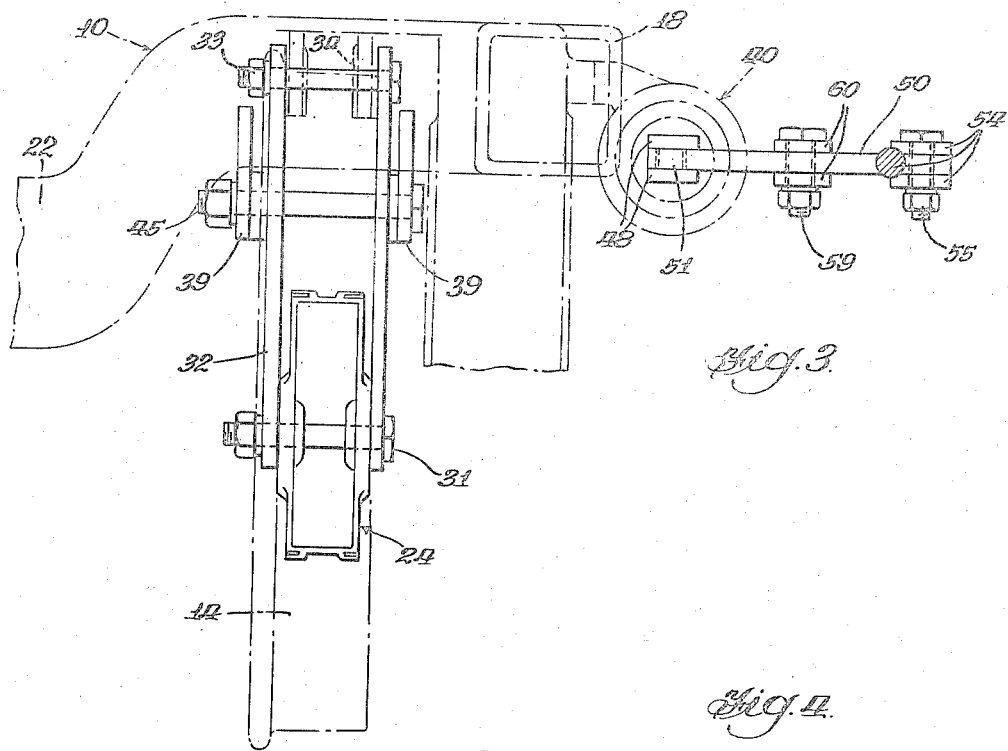
Figure 3 is a fragmentary sectional view taken along the line 3—3 of Figure 1.
Figure 4:
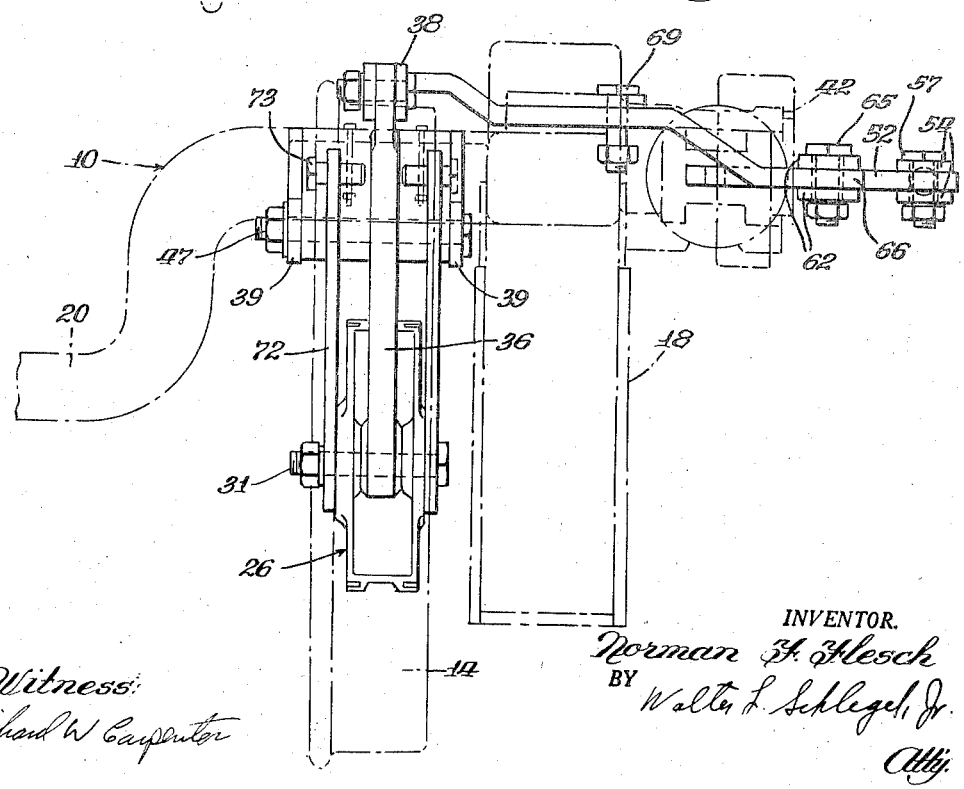
Figure 4 is a fragmentary end elevational view of the structure illustrated in Figure 1, as seen from the left.

Now referring to Figure 2, it will be seen that the braking is achieved by a pair of brake shoe assemblies 24 and 26, which are positioned adjacent and engageable with the respective inner and outer sides of each wheel 14. The brake shoe assemblies illustrated are of the conventional type comprising a brake head 28 having a brake shoe 30 keyed thereto to engage the related surface of the adjacent wheel 14.

The inner brake shoe assemblies 24 are pivotally connected by pins 31 to the lower extremities of inner dead vertical brake levers 32, the upper extremities of said levers being pivotally connected by pins 33 to mounting brackets 34 secured to the transoms 22 adjacent the respective wheels.

The outer brake shoe assemblies 26 are pivotally connected by pins 32 to the lower extremities of outer live vertical levers 36, the upper extremities of which are provided with linkage or clevis connections 38. The inner and outer brake levers 32 and 36 associated with each wheel are interconnected intermediate their ends by straps 39 pivoted to the levers by pins 45 and 47, respectively.

Again referring to Figure 1, it will be seen that a power cylinder 40 and a slack adjusting device 42, spaced from each other longitudinally of the truck, are mounted on the outboard sides of the side frame 18 by mounting brackets 41 and 43, respectively. The power cylinder 40 preferably comprises a cylinder body 44 having a piston 46 and piston rod 48 extending outwardly therefrom.

The power cylinder and the slack adjuster are pivotally connected by pins 51 and 53 to the inboard extremities of generally horizontal live and dead operating levers 50 and 52, respectively. The operating levers 50 and 52 are pivotally connected at their outboard extremities by pins 55 and 57, respectively, to the opposite ends of a connecting rod 54, and are pivotally connected intermediate their ends by pins 59 and 61, respectively, to the respective inner ends of pull rods 60 and 62, the opposite or outer ends of the pull rods 60 and 62 being connected by pins 63 and 65, respectively, to the outer extremities of substantially horizontal dead actuating levers 64 and 66, respectively. The actuating levers 64 and 66 are pivoted intermediate their ends by pins 67 and 69, respectively, to the opposite ends of the side frame 18, the inboard extremities of the actuating levers being pivotally connected to the respective outer brake lever links 38. A plurality of support brackets 70, rigidly secured to the side frame 18 and extending outwardly therefrom, may be provided to offer sliding support for rods 54, 60 and 61.

Additional support for the outer brake shoe assemblies may be provided by a pair of brake hangers 72, pivoted at their lower extremities by pins 32 to their respective brake shoe assemblies 26, and at their upper extremities by pins 73 to the side frame.

To describe the operation of the invention, as power cylinder 40 in energized piston rod 48 moves to the left, as seen in Figure 1, causing the operating lever 50 to rotate counterclockwise about pin 55 thereby moving pull rod 60 to the left and urging actuating lever 64 to rotate clockwise about pin 67 to bring the related brake shoe assemblies into engagement with the right hand wheel 14.

At this time the pivot point of lever 50 shifts from pin 55 to pin 59 and lever 50 continues to rotate counterclockwise, moving connecting rod 54 to the right, as seen in Figure 1. This causes operating lever 52 to rotate counterclockwise about pin 61, moving the pull rod 62 to the right and urges actuating lever 66 to rotate counterclockwise about pin 69 to bring the related brake shoe assemblies into engagement with the left hand wheel. It is to be understood that all of this action of the linkage takes place at substantially the same time.

Thus it will be seen that with the above described linkage arrangement I have been able to position members of the brake linkage elements outboardly of the side frame with none of the linkage being disposed in the center between the wheels of the truck. In so doing, I have left the entire space in the truck between the wheels free for the mounting of other necessary truck parts and fittings not related to the actual brake arrangement.

I claim:

1. In a clasp brake arrangement for a four wheel railway car truck having a frame comprising a pair of spaced side frames interconnected intermediate their ends by a pair of spaced transoms and interconnected at their ends by a pair of spaced end rails, and a pair of supporting wheel and axle assemblies, the combination of: friction means positioned adjacent and engageable with inner and outer sides of the respective assemblies, four substantially vertical brake levers pivotally connected at their lower ends to the respective friction means, the brake levers associated with the respective inner friction means being dead levers having their upper ends pivotally connected to the respective transoms, the brake levers associated with the outer friction means being live levers, strap means interconnecting the live and dead levers associated with the respective assemblies intermediate the ends of said live and dead levers, a pair of generally horizontal dead actuating levers pivoted intermediate their ends to the side frame adjacent the respective end rails, the inboard ends of the actuating levers being operatively connected to the upper ends of the respective outer brake levers, a power cylinder and a slack adjuster mounted on the side frame outboardly thereof and spaced longitudinally of the truck from each other, generally horizontal live and dead operating levers having their inboard ends pivotally connected to the power cylinder and slack adjuster, respectively, a pair of pull rods having their outer ends pivotally connected to the outboard ends of the respective actuating levers and having their inner ends pivotally connected to the respective operating levers intermediate the ends of said operating levers, and another pull rod interconnecting the outboard ends of the respective operating levers, said operating levers and said pull rods being disposed outboardly of the side frame.

2. In a clasp brake arrangement for a four wheel railway car truck having a frame comprising a pair of side members interconnected by a plurality of transversely extending members, and a pair of supporting wheel and axle assemblies, the combination of: friction means positioned adjacent and engageable with the inner and outer sides of the wheels on the respective assemblies, brake levers pivotally connected at their lower ends to the respective friction means, the brake levers associated with the inner friction means being fulcrumed at their upper ends to the frame, the brake levers associated with the outer friction means being live levers, means interconnecting the live and dead levers associated with the respective assemblies, a pair of dead actuating levers fulcrumed intermediate their ends to the frame adjacent the ends of the frame, said actuating levers being connected at their inboard ends to the upper ends of the respective outer brake levers, a power cylinder and a slack adjuster carried by the frame and spaced from each other longitudinally of the frame, live and dead operating levers having their inboard ends pivotally connected to the power cylinder and slack adjuster, respectively, a pair of pull rods connecting the actuating levers to the respective operating levers, and another pull rod interconnecting the operating levers, said operating levers and said pull rods being disposed entirely outboardly of the side members.

3. In a clasp brake arrangement for a four wheel railway car truck having a frame supported by a pair of spaced wheel and axle assemblies, friction means disposed on the inner and outer sides of the respective assemblies, a pair of dead brake levers pivotally connected to the respective inner friction means and fulcrumed to the frame adjacent opposite ends of the frame, a pair of live brake levers pivotally connected to the outer friction means, strap means interconnecting the brake levers associated with each assembly, a pair of dead actuating levers fulcrumed to the frame adjacent the ends of the frame and operatively connected to the live brake levers, a pair of pull rods connected to the respective actuating levers, a slack adjusting member and a power member mounted on the frame and spaced from each other, live and dead operating levers interconnecting the members and the respective pull rods, and another pull rod interconnecting the operating levers, said operating levers and said pull rods being disposed entirely outboardly of the frame.

4. In a tread brake arrangement for a railway car truck comprising a frame and a pair of supporting wheel and axle assemblies, the combination of: brake means disposed adjacent and engageable with the respective assemblies, said brake means including a pair of live brake levers; a pair of dead actuating levers fulcrumed intermediate their ends to the frame and operatively connected at their inboard ends to the upper ends of the respective brake levers; a power cylinder member and a slack adjuster member mounted on the frame; live and dead operating levers having their inboard ends connected to the respective members; a pair of pull rods connecting the outboard ends of the actuating levers to the respective operating levers; and another pull rod interconnecting the outboard ends of said operating levers; said members, said operating levers, and said pull rods all being disposed entirely outboardly of the frame.

5. A tread brake arrangement according to claim 4, wherein said dead actuating levers are disposed adjacent opposite ends of the frame and outwardly of the related wheel and axle assemblies.

References Cited in the file of this patent

UNITED STATES PATENTS

| | | |
|---|---|---|
| 1,921,599 | Aurien | Aug. 8, 1933 |
| 2,135,120 | Baselt | Nov. 1, 1938 |
| 2,135,121 | Baselt | Nov. 1, 1938 |
| 2,179,387 | Tack | Nov. 7, 1939 |